United States Patent [19]
Schirmer

[11] 3,948,579
[45] Apr. 6, 1976

[54] TACKLE BOX WITH IMPROVED TRAY STRUCTURES

[76] Inventor: Roy E. Schirmer, 54 Haven Drive, Fort Smith, Ark. 72901

[22] Filed: Dec. 28, 1973

[21] Appl. No.: 429,364

[52] U.S. Cl............... 312/111; 43/57.5 R; 206/315; 220/20
[51] Int. Cl.² ................... F16B 12/00; A47B 47/00
[58] Field of Search ........ 206/527, 315; 220/20, 23, 220/23.4, 343; 190/16; 312/111, 107; 43/57.5 R

[56] References Cited
UNITED STATES PATENTS

| | | | |
|---|---|---|---|
| 1,577,566 | 3/1926 | Cryder | 43/57.5 R |
| 2,474,752 | 6/1949 | Montgomery | 206/315 |
| 2,539,302 | 1/1951 | Fye | 220/20 |
| 2,724,208 | 11/1955 | Nelson | 43/57.5 R |
| 2,998,898 | 9/1961 | Gerr et al. | 220/343 |
| 3,071,885 | 1/1963 | Mackay | 43/57.5 R |
| 3,330,608 | 7/1967 | Druger, Jr. | 206/315 |
| 3,490,169 | 1/1970 | Tweed | 43/57.5 R |

Primary Examiner—William T. Dixson, Jr.
Attorney, Agent, or Firm—George R. Douglas, Jr.; Anthony D. Cennamo

[57] ABSTRACT

A tackle box with improved tray structures and forming a plurality of self-contained compartments each immediately accessible apart from each other, as to type or the like, by selectively opening one section at a time. In this manner only one unit is open and all others are closed and protected from having their respective contents spilled out, mixed-up, or otherwise disturbed, by means of a transparent Plexiglass lid or cover disposed over the respective trays in hinged relation thereto.

3 Claims, 7 Drawing Figures

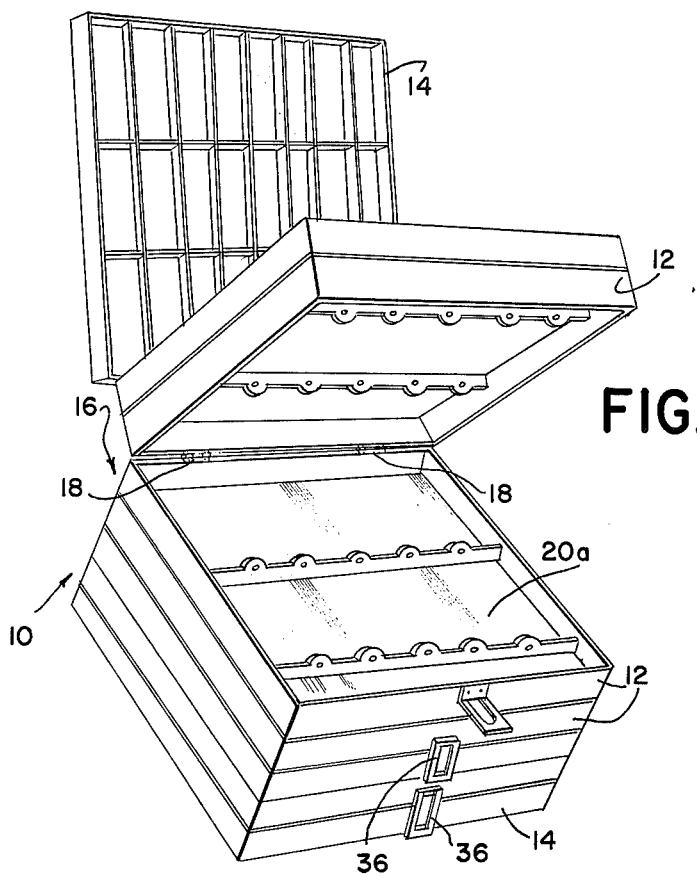
FIG. 4
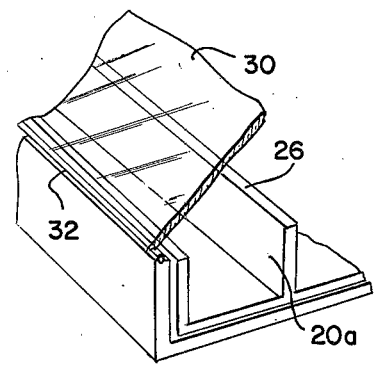
FIG. 5
FIG. 6
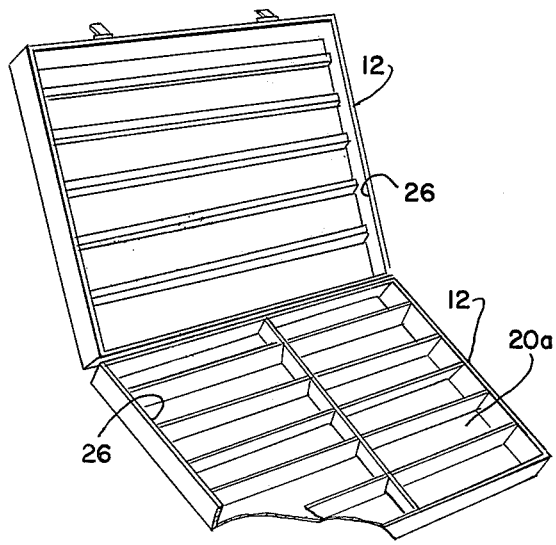
FIG. 7
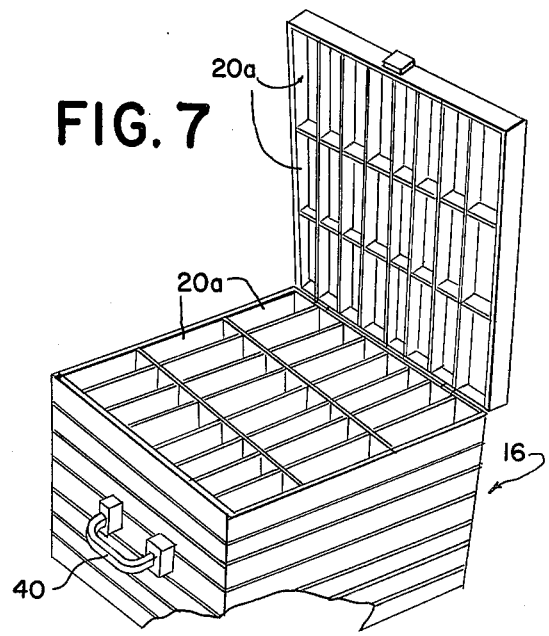

TACKLE BOX WITH IMPROVED TRAY STRUCTURES

CROSS-REFERENCES TO RELATED INFORMATION AND REFERENCES

The present application is an improvement over prior art devices and arrangements such as exemplified in the following: Schoenner, U.S. Pat. No. 758,700; Majeski, U.S. Pat. No. 3,005,671; DeWitt, U.S. Pat. No. 2,125,856; Burden, U.S. Pat. No. 2,558,124; Waggoner, U.S. Pat. No. 2,566,388; Hawley, U.S. Pat. No. 2,948,080; Imel, U.S. Pat. No. 3,113,817.

The present invention distinguishes over these references, as none of these patents, or others found essentially of the same disclosure in Class 43, subclasses 4, 54.5R and 57.5; Class 206, subclasses 6, 12, 16R, 46AM, 46S, 46SG, 46P, 46H, 45.15; Class 220, subclasses 20.23, 22, 23, 83 and 97 and Class 312, subclass 199, show or suggest the invention. Schoenner merely shows a single-array case hingedly connected together as does DeWitt, Burden, Waggoner, Hawley and Imel. Majeski merely shows a tackle box with superposed trays.

BRIEF SUMMARY OF THE INVENTION

The present invention relates to tackle boxes with improved component structures of a series of open boxes hingedly interconnected and having a plurality of selectively shaped compartments in and throughout the series of open boxes. More particularly, the invention relates to arranging open boxes in back-to-back relation to each other and disposing the closed side of adjacent boxes in secured relation by glue, integral formation of the elements, or the like, and arranging a hinge element along a connecting common edge interfacing the open side of the boxes.

BACKGROUND OF THE INVENTION

The tackle box of the invention is useful for carrying fishing lures, hooks, and other small assorted items, and tools, not necessarily limited in any way to the art and sport of fishing.

All existing fishing tackle boxes which are presently known when opened expose all types of lures at once and make them subject to spilling, mixing or being lost or misplaced. Even then, a great deal of "fumbling and separating" may be required to find the selected type or color one chooses to use at a given time.

This box of the present invention is comprised of a number of self-contained compartments immediately accessible, as to type, etc., by opening one section only. The one unit is still protected from danger of spilling, mixing, etc., by a transparent cover, hinged for quick open accessibility. Since only one section is opened, at any given time, there is no danger of "misfiling" a lure after using it. Whereas, the usual tackle box is of a fixed size, regardless of needs, or type of lures of any individual fisherman.

This box of the invention is so designed as to allow the addition of one or more units by the simple use of four small screw posts. These units could be varied, removed or changed at any time, by adding, removing or changing the self-contained, specialized compartments. In other words, if the fisherman never used worms or jigs, he would omit these specialized compartments and use the ones to fit his needs. These specialized compartments are all interchangeable in all units.

The boxes are made of a suitable material, such as sheet metals, ferrous, or non-ferrous, wood, plastic or the like. Sizes 20 inches × 12 inches × 18 inches or variations thereof; various shapes and several sizes can be made.

Another advantage of this box is that units may be fastened, at will, to the sides of the boat and filled with any specialized compartment.

The unit can be constructed of larger dimensions and compartmentized to hold stretch boots, rainsuits, reels and small tools. It can replace any two units or be added to the end of any box by using four screw posts.

This box of the present invention as contemplated by the best mode of its emodiment may be used for small parts and tools.

FIELD OF THE INVENTION

It is an object and advantage of the present invention to provide a tackle box or the like with improved component parts and structures that may have added, deleted or interarranged components and compartments of open boxes. The boxes may have compartments or trays fitting therein which in turn may have compartmentation.

A further feature, object and advantage of the invention is to provide a plastic cover overlaying each of the several open boxes or trays of the tackle box to retain in place items held or positioned therein.

It is a further object to provide securing or locking means for retaining and securing closed the array of elements forming the tackle box.

BRIEF DESCRIPTION OF THE SEVERAL VIEWS OF THE DRAWINGS

The above and other objects and advantages of the invention will become apparent upon full consideration of the following detailed description and accompanying drawings in which

FIG. 4 is a perspective view of a further modification as another preferred embodiment and best mode of the present invention showing an array of box sections forming the tackle box but having tray inserts;

FIG. 5 shows a broken-away, perspective view of part of a box section and an interchangeable tray insert;

FIG. 6 is a perspective view like FIG. 2 of the tackle box of FIG. 4; and

FIG. 7 is another modification of the invention thereof.

DETAILED DESCRIPTION OF THE PREFERRED EMBODIMENTS

Figure 1:
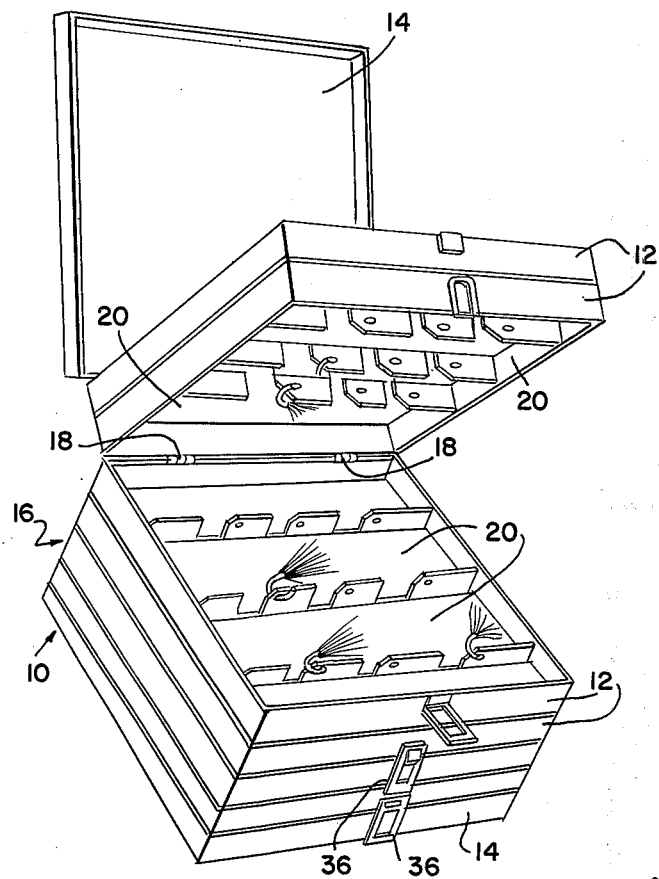
FIG. 1 is a perspective view of one of the preferred embodiments of the present invention showing a wooden model of a tackle box with improved composite tray structure.
Figure 2:
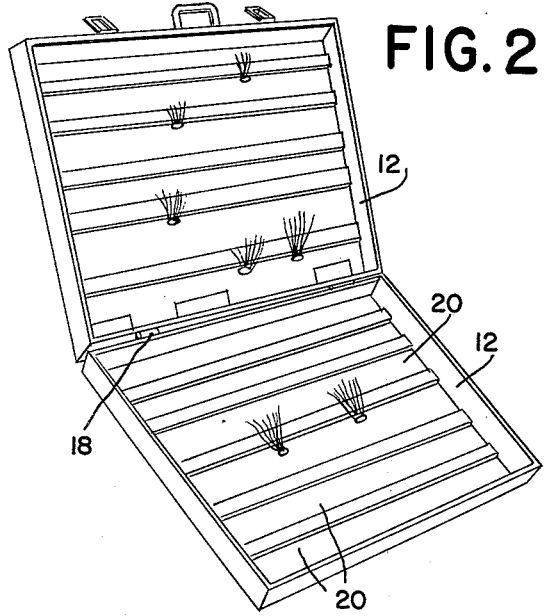
FIG. 2 is a perspective view of one of the composite elements comprising the tackle box of FIG. 1.
Figure 3:
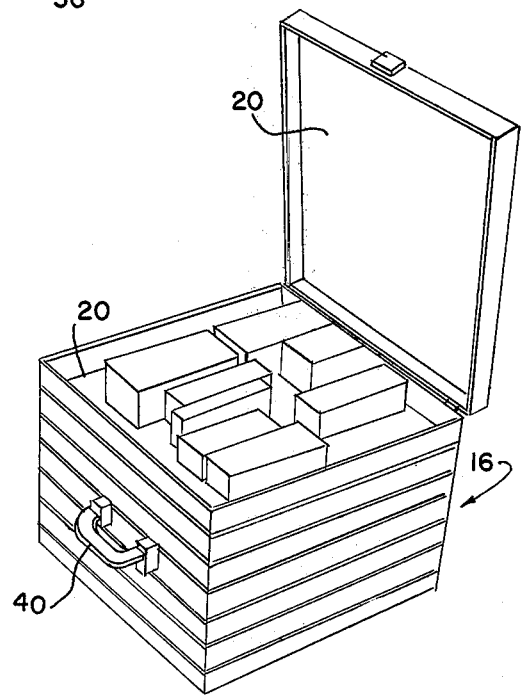
FIG. 3 is a modification of the embodiment shown in FIG. 1.

Referring now to the drawings there is shown in FIGS. 1-3 a tackle box 10 or the like consisting of a plurality or series of open containers, recepticles or boxes 12,12,12 each in relative back-to-back orientation to each other and the series terminating in end boxes 14,14. Interposed along a common plane 16 of the series are hinged connecting means 18,18 comprising a pair of conventional hinges used in a hinge post or the like as found commonly for sale in hardware stores. Also, one may use a piano hinge type of connecting means (not shown) within the purview of the present invention.

The hinged connecting means 18,18 join adjacent edges of the boxes 12,12,12 disposed throughout the common plane 16. The hinged connecting means is usually disposed intermediate that set of back-to-back boxes 12,12 in which the boxes are open-faced to each other as shown in FIG. 1.

Back-to-back bottoms of the boxes 12,12 are appropriately and by conventional means fixed or secured by glue, cement or other mechanical means, including integrating the interconstruction of the two boxes 12,12 into a common construction, so that as shown in FIGS. 1–3, the arrangement forms recesses for storing or receiving various fishing tools, lures, bait, and the like, as shown exemplarily.

Within the open boxes 12,12 are severally disposed a number of demarkation elements, liners, or compartment forming devices defining various compartments 20,20. These various-shaped compartments exist throughout the series of open boxes 12,12,12.

The modification of the arrangement of the present invention shown in FIGS. 4–7 comprises the series of open boxes 12,12 and in which the boxes have inserted therein at least one, or more (not shown) trays 26, formed into various-sized compartmented sections 20a,20a,20a as shown, securely interfitting within the open boxes 12. Thus, the compartmented sections 20a are constructed and arranged as tray elements for each of the series of open boxes.

As shown in FIG. 5 a plastic sheet or cover 30 that may be translucent or transparent, or even impermeable to the transmission of visible light is shaped having its edges generally disposed to be coterminous with the edges of the open boxes and having one edge 32 connected to an edge of the open box as shown. The plastic cover extends over the surface of the open box to retain in place the several items that may be stored or positioned within the compartments.

To secure the tackle box into a closed or stored position, there may be provided clip or closure means 36,36 as shown and illustrated in FIGS. 1 and 4. A handle or other carrying means 40 may similarly be provided as illustrated in FIGS. 3 and 7.

The tackle box may be constructed of such material as wood, metal, cellulose, plastic, coated cardboard or paper, or other similar material, or combinations of them. It is also within the purview of the invention to conveniently at any time add one or a series of boxes 12 to the cover box 14, or to replace the cover box 14 with additional series of one or more open boxes, or to rearrange or reorient any of the given open boxes 12,12,12 to a new series by use of interarranging, deleting or adding said hinged connecting means, which may comprise hinge posts and securing screws therefor.

CONCLUSION

By means and use therefore of the present invention there is provided a box composed of a number of self-contained compartments immediately accessible as to type by opening one section only. The one unit is still protected from danger of spilling, mixing and the like, by a transparent cover, hinged for quick accessibility. Since only one section is opened, at any given time, there is no danger of misfiling a lure after using. Whereas, the usual tackle box is of a fixed size, regardless of the needs of any individual fisherman.

This box of the invention is so designed as to allow the addition of one or more units, by the simple use of four small screws or bolts. These units could be varied, at any time, by adding or removing sections, as would serve the desires of the user.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. A tackle box with improved component structures comprising a series of open boxes in relatively back-to-back relation to each other defining recesses therein and having hinged connecting means joining adjacent open edges of the boxes together throughout a connecting common plane said adjacent open edges being intermediate of an open face of said boxes; means securing adjacent bottom surfaces of said boxes together; a plurality of variously arranged and shaped compartments being positioned within and throughout said recesses in said series of open boxes; said compartments being constructed and arranged as tray elements for each of said recesses in said series of open boxes; a plastic cover being translucent and hingedly connected at one edge to each of said recesses of said series of open boxes to cover and be coterminous with the open recess thereof to retain items in place within such compartment; clip means being provided for securing closed the adjacent open and free edges of the open boxes and forming said series of open boxes in an arrangement that each is immediately accessible apart from another of said series; a handle being disposed and mounted along one of the free edges of the open boxes for carrying the assembled tackle box when the series of open boxes is closed; said series of open boxes being constructed of material selected from a group consisting essentially of wood, metal, cellulose, plastic, cardboard, paper or the like; selected ones of said series of open boxes may be added to or deleted from by interarranged means of added, deleted or interarranged disposition of said hinged connecting means; and said hinged connecting means including hinges, hinge posts and securing screws therefor.

2. The invention of claim 1 wherein said series of open boxes terminate in end boxes.

3. The invention of claim 1 wherein said handle is disposed midway of said series of open boxes.

* * * * *